3,778,467
AMINOALKYL-ETHANOANTHRACENES
Max Wilhelm, Allschwil, and Walter Riess, Basel, Switzerland, assignors to Ciba-Geigy Corporation, Ardsley, N.Y.
No Drawing. Filed Apr. 29, 1969, Ser. No. 820,319
Claims priority, application Switzerland, May 16, 1968, 7,284/68; Mar. 25, 1969, 4,480/69
Int. Cl. C07c 91/00, 93/00, 97/10
U.S. Cl. 260—490    10 Claims

ABSTRACT OF THE DISCLOSURE

Compounds of the formula

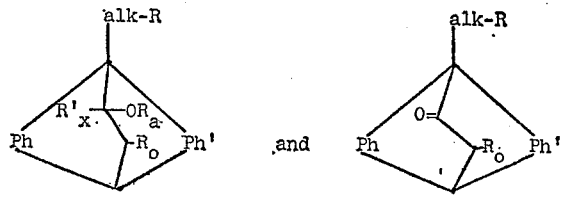

in which

Ph and Ph' are optionally substituted o-phenylene radicals
alk stands for lower alkylene
R stands for an optionally substituted amino group
$R_o$ represents hydrogen or lower alkyl
$R'_x$ represents hydrogen or lower alkyl
$R_a$ represents hydrogen or acyl
are useful as psychopharmaceuticals.

SUMMARY OF THE DISCLOSURE

The present invention relates to new aminoalkyl-ethanoanthracenes. Especially it concerns N-substituted 9-(aminoalkyl)-9,10-dihydro - 9,10 - ethano-anthracenes containing the nucleus of the formula

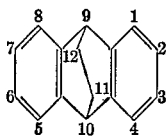

and containing a free or acylated hydroxyl group or an oxo group in position 12, and their salts.

The N-substituted aminoalkyl radical in position 9 is preferably an N-substituted amino-lower alkyl radical in which the alkylene radical connecting the substituted amino group with the anthracene nucleus is especially a lower linear or branched alkylene radical preferably containing 1 to 4 carbon atoms, for example the methylene, ethylene-(1,2), ethylidene, propylene-(1,2), propylene-(1,3), propylidene, butylidene, butylene-(1,2), butylene-(1,3), butylene-(2,3) or butylene-(1,4) radical.

The amino group of the N-substituted aminoalkyl radical may be secondary or tertiary; preferably, it is an aliphatic amino group, that is to say an amino group containing one or two radicals of aliphatic nature. As radicals of aliphatic nature there come into consideration those whose first carbon atom linked with the nitrogen atom is not a member of an aromatic system. Thus, there may be mentioned as substituents of a secondary or tertiary amino group: Lower hydrocarbon radicals of aliphatic nature whose carbon chain may be interrupted by hetero atoms, such as oxygen, sulfur or nitrogen atoms, and/or substituted by hydroxyl groups. Lower hydrocarbon radicals of aliphatic nature suitable as substituents of the amino groups are especially such as contain at most 8 carbon atoms, being alkyl, alkenyl, alkylene, alkinyl, cycloalkyl, cycloalkenyl, cycloalkyl-alkyl or cycloalkyl-alkenyl radicals or cycloalkenyl-alkyl or cycloalkenyl-alkenyl radicals, aralkyl or aralkenyl radicals, for example phenyl-lower alkyl or phenyl-lower alkenyl radicals, for example a benzyl, phenylethyl or cinnamyl group which may be substituted for instance by lower alkyl groups, lower alkoxy groups, halogen atoms, trifluoromethyl and/or nitro groups. Radicals of this kind interrupted by hetero atoms are especially oxaalkyl, oxaalkylene, azaalkylene or thiaalkylene radicals. As substituents of the amino group there may be specially mentioned methyl, ethyl, allyl, propyl, isopropyl, methallyl, propargyl radicals; linear or branched butyl, pentyl, hexyl or heptyl radicals linked in any desired position; 3-oxabutyl, 3-oxapentyl, 3-oxaheptyl, 2-hydroxyethyl, 3-hydroxypropyl, butylene-(1,4), pentylene-(1,5), hexylene-(1,5), hexylene-(1,6), hexylene-(2,5), heptylene-(1,7), heptylene-(2,7), heptylene-(2,6), 3-oxapentylene-(1,5), 3-thiapentylene-(1,5), 2,4-dimethyl - 3 - thiapentylene-(1,5), 3-azapentylene-(1,5), 3-lower alkyl-3-azapentylene-(1,5) such as 3 - methyl - 3 - azapentylene - (1,5), 3-(hydroxy-lower alkyl)-3-azapentylene-(1,5) such as 3-(β-hydroxyethyl)-3-azapentylene-(1,5), 3-oxahexylene-(1,6) or 3-azahexylene-(1,6) radicals; possibly lower alkylated, such as methylated, cyclopropyl, cyclopentyl or cyclohexyl radicals, or cyclopropyl-, cyclopentyl- or cyclohexyl-methyl or -ethyl radicals.

The substituted amino group is especially a mono- or di-lower alkylamino group such as methyl-, ethyl-, propyl-, butyl-, isopropyl-, secondary butyl-, dimethyl-, diethyl-, N - methyl-N-ethyl-, dipropyl-, diisopropyl-, dibutyl-, disecondary butyl- or di-amyl-amino group or an optionally C-lower alkylated and/or in the ring β mono-unsaturated pyrrolidino or piperidino group of an optionally C-lower alkylated piperazino, N'-lower alkyl- or N'-(hydroxy-lower alkyl-piperazino, thiomorpholino or morpholino group.

Acylated hydroxyl groups are hydroxyl groups substituted by carboxylic acid radicals, for example by aliphatic or aromatic carboxylic acid radicals, such as for example hydroxyl groups esterified by benzoic acids, such as the benzoyloxy group or especially lower alkanoyloxy groups, primarily those having 6 carbon atoms, such as the propionyloxy, butyryloxy, caproyloxy or in the first place the acetoxy group.

The new compounds may contain further substituents. Inter alia, they may contain, for example on the aromatic rings (positions 1 to 8) lower alkyl groups, lower alkoxy groups, halogen atoms, trifluoromethyl groups and/or nitro groups, and each of the two nuclei (positions 1 to 4, and 5 to 8) contains advantageously no more than two, preferably no more than one of the said substituents.

Furthermore, the new compounds may be substituted in position 11 or 12. Suitable substituents are primarily lower alkyl radicals, especially methyl radicals.

A lower alkyl radical on a carbon atom is especially an alkyl radical containing 1 to 6 carbon atoms, for example a methyl, ethyl, propyl or isopropyl radiacl or a linear or branched butyl, pentyl or hexyl radical linked in any desired position.

Lower alkoxy groups are especially those containing no more than 6 carbon atoms, for example methoxy, ethoxy, propoxy, isopropoxy or butoxy groups. Especially suitable halogen atoms are fluorine, chlorine or bromine atoms.

The new compounds possess valuable pharmacological properties, especially a psychotropic activity. As can be shown in animal tests, for example on mice, on oral administration in doses of 30 to 100 mg./kg., they inhibit the psychomotor excitation produced by mescaline. The new compounds are, therefore, useful as psychopharmaceuticals. The new compounds are also valuable intermediates for the manufacture of other useful substances, especially of pharmacologically active compounds.

Special mention deserve the compounds of the formula

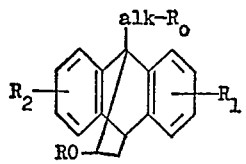

and the compounds of the formula

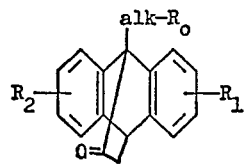

in which R represents a lower alkanoyl radical, for example the acetyl radical, or primarily a hydrogen atom, alk represents a lower alkylene radical containing 1 to 3 carbon atoms, especially the radical of the formula $-(CH_2)_n-$ (where $n=1$, 2 or 3), $R_o$ represents a mono- or di-lower alkylamino group, especially a mono- or dimethylamino group, a benzylamino group, a piperidino or pyrrolidino group optionally β-mono-unsaturated in the ring and/or C-lower alkylated; or a optionally C-lower alkylated morpholino, thiomorpholino, piperazino, N'-lower alkylpiperazino or N'(hydroxy-lower alkyl)-piperazino group such as an N'-methyl- or N'-(β-hydroxyethyl)-piperazino group, and $R_1$ and $R_2$ may be identical or different and are lower alkyl or lower alkoxy groups, especially methoxy, halogen atoms, especially chlorine, nitro groups or preferably hydrogen atoms, and more especially 9-(γ-dimethylaminopropyl)-12-oxo-9,10-dihydro-9,10-ethano-anthracene, 9-(γ-methylamino - propyl) - 12-oxo-9,10-dihydro-9,10 - ethano-anthracene, and primarily 9-(dimethylaminomethyl)-12-acetoxy-9,10 - dihydro-9,10-ethanoanthracene which, for example on oral administration of a dose of 30 mg./kg. produces in the mouse a distinct mescaline-antagonistic effect.

The new compounds are manufactured by known methods.

Preferably, in a 9,10-dihydro-9,10 - ethano-anthracene that contains in position 12 a free or acylated hydroxyl group or an oxo group and in position 9 a radical X convertible into an N-substituted amino-alkyl group, X is converted into an N-substituted aminoalkyl radical.

A radical X convertible into an N-substituted aminoalkyl group is, for example, a corresponding radical which differs from the desired aminoalkyl radical in that it contains a double bond extending from the nitrogen atom to a vicinal carbon atom (in which case the said carbon atom carries one hydrogen atom fewer). Such radicals are, for example, corresponding N-substituted imino- or immonium-alkyl groups or corresponding N-substituted amino- or ammonium-alkyl groups in which one substituent is linked through a double bond with the nitrogen atom of the amino group.

The conversion of the said radicals into an aminoalkyl group is carried out, for example, by reduction of the double bond. The reduction is performed in the usual manner, for example with hydrogen in the presence of a platinum, palladium or nickel catalyst. Shiff's bases can also be reduced by means of sodium borohydride or lithium-aluminum hydride. Azomethine bonds may also be reduced with formic acid. The reduction is advantageously performed in a solvent, for example in an organic solvent. The catalytic reduction is carried out, for example, with the use of a lower alkanol such as methanol or ethanol as solvent.

A further radical X convertible into an N-substituted aminoalkyl group is, for example, a corresponding radical that differs from the desired aminoalkyl radical in that it carries an oxo group on at least one carbon atom vicinal to a nitrogen atom or an optionally further N-substituted amino-alkyl radical whose nitrogen atom carries an esterified carrboxyl group, such as, for example a carbalkoxy group or an aralkoxy-carbonyl group in which the alkyl and aralkyl radicals are, for example, those mentioned above. Such radicals are more especially corresponding N-substituted carbamyl or carbamylalkyl radicals, corresponding acylaminoalkyl radicals or carbalkoxyaminoalkyl radicals. These radicals are converted into an N-substituted aminoalkyl group by reducing the oxo group(s) to hydrogen atoms or by reducing the esterified carboxyl group to the methyl group, respectively.

The reduction is carried out in the usual manner, for example with an amide reducing agent, above all with lithium-aluminum hydride.

Another radical X convertible into an N-substituted aminoalkyl group is, for example, an N-unsubstituted aminoalkyl group. The conversion of this radical into the N-substituted aminoalkyl group is carried out, for example, by substitution, for instance with one of the substituents mentioned above for the amino group, especially by reaction with a reactive ester of a suitable alcohol or with a 1,2-epoxide, for example ethylene oxide. Reactive esters suitable for this purpose are in the first place esters with hydrohalic acids such as hydrochloric, hydrobromic or hydriodic acid, with sulfuric acid or with aryl-sulfonic acids such as benzenesulfonic, p-bromobenzene-sulfonic or p-toluene-sulfonic acid.

The reaction is carried out in the usual manner, advantageously in the presence of a solvent and, for example, in the presence of a condensing agent such as a basic condensing agent, at room temperature or with heating or cooling.

Another radical convertible into an N-mono-substituted aminoalkyl group is, for example, an N-mono-substituted aminoalkyl group which contains on the nitrogen atom additionally an eliminable radical Y. The conversion into the N-mono-substituted aminoalkyl group is achieved, for example, by elimination of the radical Y.

An eliminable radical is for example, a radical eliminable by hydrolysis or reduction. The elimination is effected in the usual manner, for example by hydrolysis or reduction.

A radical eliminable by hydrolysis is, for example, an acyl radical, especially an alkanoyl radical, in the first place a lower alkanoyl radical, such as acetyl, benzoyl, phenylalkanoyl, carbalkoxy, for example the tertiary butoxycarbonyl, carbethoxy or carbomethoxy radical, or an α-aralkoxycarbonyl radical, for instance a carbobenzoxy radical.

The hydrolytic elimination of the radical eliminable by hydrolysis may be carried out in the usual manner, for example with a hydrolyzing agent, for example in the presence of an acid agent, for instance a dilute mineral acid such as sulfuric or a hydrohalic acid, or preferably in the presence of a basic agent, for example an alkali metal hydroxide such as sodium hydroxide.

A radical eliminable by reduction is, for example, an acyl radical eliminable by reduction, for instance an α-aralkoxycarbonyl radical such as carbobenzoxy radical, which can be eliminated, for example, by hydrogenolysis, for instance by reduction with catalytically activated hydrogen, such as hydrogen in the presence of a hydrogenating catalyst, such as palladium or platinum catalyst.

When the starting material used in those of the processes mentioned above, in which the conversion into the N-substituted aminoalkyl group is performed by reduction or hydrogenolysis, is a 12-oxo compound, it is possible—depending on the type of reducing agent used—to reduce the oxo group at the same time to the hydroxyl group. If in such a case it is desired to obtain the oxo compound, the resulting hydroxyl group may be reoxidized to the oxo group, for example as described below.

When the starting material is a compound with an acyloxy group in 12-position and the reducing agent is lithium-aluminum hydride or a similar reducing agent, the 12-acyloxy group can simultaneously be reduced to the hydroxyl group. If in this case an acyloxy group is desired, the resulting 12-hydroxy group may be acylated, for example as described below.

The new compounds in which the N-substituted aminoalkyl radical is an optionally substituted 1-aminoalkyl radical and which contain in 12-position a free hydroxyl group, can also be obtained when in a corresponding 6′,11,3′,4′-tetrahydro - 6′,10 - methano-spiro[anthracene-9 (10H),5′(2′H)[1,3]oxazine] the oxazine ring is split up by reduction.

The reductive cleavage is performed in per se conventional manner for example with hydrogen in the presence of a hydrogenation catalyst, for example a platinum, palladium or nickel catalyst, by means of a metal amalgam, such as sodium amalgam, or by means of a di-light metal hydride, such as for example sodium borohydride or lithium-aluminum hydride. Formic acid can likewise be used. The reduction is preferably performed in a solvent, for example an organic solvent. For the catalytic reduction there is used, for example, a lower alkanol, such as methanol or ethanol, as solvent. When formic acid is used as reducing agent, it is preferable to work under hydrolyzing conditions, such as an excess of water.

Substituents in resulting compounds may be introduced, modified or eliminated within the framework of the final products.

Thus, for example, in a resulting 12-hydroxy compound the hydroxyl group may be oxidized to the oxo group.

The oxidation is carried out in the usual mannner, for example by treatment with an oxidant, for example a chromium trioxide compound, such as chromic acid or chromium trioxide-pyridine, a hypohalite such as tertiary butylhypochlorite, a copper-(II)-salt, for example copper sulfate, bismuth oxide, or for instance by the Oppenauer method, for example by treatment with a ketone such as a lower alkanone, for example acetone, a cycloalkanone such as cyclohexanone or a quinone, in the presence of a suitable catalyst such as a metal salt, especially an aluminum salt, of branched lower alkanols, such as aluminum tertiary butylate or aluminum isopropylate or an aluminum phenolate.

In a resulting 12-oxo compound the oxo group may be reduced in the usual manner to the hydroxyl group.

The reduction is carried out in the usual manner, for example by metallic reduction, such as treatment with sodium in ethanol, or with a complex metal hydride such as sodium borohydride, or with catalytically activated hydrogen, for example hydrogen in the presence of a platinum, palladium, nickel or copper catalyst, such as platinum oxide, palladium carbon, Raney nickel or copper chromite. The reaction is preferably performed in the presence of a diluent and/or solvent, at room temperature or with cooling or heating, under atmospheric or super-atmospheric pressure.

The oxo group may also be reduced by the Meerwein-Ponndorf-Verley method. For example, the oxo compound may be treated in the usual manner in a lower alkanol, such as isopropanol, in the presence of a suitable alkanolate, such as aluminum isopropylate.

In the 12-position of resulting 12-oxo compounds, substituents can be introduced, for example lower alkyl radicals, while reducing the oxo group to the hydroxyl group. This is done in the usual manner, for example by reacting the 12-oxo compound with a reagent of the formula

$$R_o\text{-Mg-Hal},$$

in which $R_o$ is an optionally substituted hydrocarbon radical, such as for example a lower alkyl radical, and Hal represents a chlorine, bromine or iodine atom. The reaction is performed in the usual manner in the presence of an ether, such as diethyl ether or tetrahydrofuran. The metal salt so obtained is then hydrolyzed in the usual manner, for example by the addition of water or ammonium halide, to the free hydroxy compound.

Resulting 12-acyloxy compounds can be converted in the usual manner into the corresponding 12-hydroxy compounds, for example by hydrolysis, for example in the presence of acid catalysts, such as mineral acids, or basic catalysts, such as alkali metal hydroxides, for example sodium hydroxide solution.

When the amino group is at most monosubstituted, that is to say, for example an N-monosubstituted 1-aminoalkyl group, such as an aminomethyl group, acyl migration may take place during such hydrolysis, in that the acyl radical first moves to the nitrogen atom and is then split off during a later stage of the hydrolysis.

Alternatively, resulting 12-acyloxy compounds can be converted into 12-hydroxy compounds by reduction. Reduction to the free hydroxyl group is performed in the usual manner, for example with an ester reducing agent, such as sodium in a lower alkanol, a di-light metal hydride, such as lithium-aluminum hydride.

Resulting 12-hydroxy compounds can be acylated in the usual manner, for example by reaction with a halide or anhydride of a corresponding carboxylic acid.

Furthermore, for example, in compounds in which the amino group of the aminoalkyl group is a secondary amino group or an N′-unsubstituted piperazino group, substituents may be introduced, for instance as described above for the substitution of the primary amino group, especially by reaction with a reactive ester, for example one of those mentioned above, of a corresponding alcohol or with a 1,2-epoxide.

In a resulting final product that carries on the amino group of the aminoalkyl radical a hydrogenolytically eliminable radical, such as an α-aralkyl radical, for example a benzyl group, this radical may be eliminated by a known method, for example as described above for α-aralkoxycarbonyl radicals.

These subsequent conversions can be preformed separately or jointly and in any desired order of succession.

Depending on the starting materials and reaction conditions used the final products are obtained in free form or in form of their salts which are likewise included in the invention. The salts of the final products may be converted into the free bases in the known manner, for example with alkalies or ion exchange resins. When the free bases are reacted with organic or inorganic acids, especially those which are capable of forming therapeutically acceptable salts, they furnish salts. As such acids there may be mentioned, for example, the hydrohalic, sulfuric and phosphoric acids, nitric acid; aliphatic, cycloaliphatic, aromatic or heterocyclic carboxylic or sulfonic acids, such as formic, acetic, propionic, succinic, glycolic, lactic, malic, tartaric, citric, ascorbic, maleic hydroxymaleic or pyruvic acid; phenylacetic benzoic, p-aminobenzoic, anthranilic, p-hydroxybenzoic, salicyclic or p-aminosalicyclic acid, embonic, methanesulfonic, ethanesulfonic, hydroxyethane-sulfonic, ethylenesulfonic acid; halobenzenesulfonic, toluenesulfonic, naphthalenesulfonic or sulfanilic acid; methione, tryptophan, lysine or arginine.

These or other salts of the new compounds, for example their picrates or perchlorates, may also be used for purifying the resulting free bases by converting them into their salts, isolating the salts and liberating the bases again from them. In view of the close relationship between the new compounds in the free form and in the form of their salts, what has been said above and hereinafter referring to the bases concerns also the corresponding salts wherever this is possible and useful.

The invention includes also any variant of the present process in which an intermediate obtainable at any stage thereof is used as a starting material and any remaining process step(s) is/are carried out or in which a starting material is formed under the reaction conditions or used in form of a salt.

Thus, a 9-(oxoalkyl)-9,10-dihydro-9,10-ethano-anthracene which contains in 12-position an oxo group or primarily a free or acylated hydroxyl group can be reacted with a primary or secondary amine, for example in the presence of hydrogen and of a hydrogenation catalyst, or an N-unsubstituted or N-monosubstituted 9-(aminoalkyl)-9,10-dihydro-9,10-ethanoanthracene which in 12-position carries a free or acylated hydroxyl group or an oxo group can be reacted with an aldehyde or a ketone under reducing conditions, for example those mentioned above. There is thus intermediately formed a 9,10-dihydro-9,10-ethano-anthracene which carries in 12-position a free or acylated hydroxyl group or an axo group and in 9-position a radical that differs from the desired aminoalkyl radical in that it contains a double bond extending from the nitrogen atom to a vicinal carbon atom (in which case the said carbon atom carries one hydrogen atom fewer), or a corresponding 6',11,3',4' - tetrahydro-6',10-methanospiro[anthracene-9(10H),5'(2'H)[1,3-oxazine] which is then reduced according to this invention.

Furthermore, the 12-acyloxy compounds having in 9-position an N-unsubstituted 1-aminoalkyl group, especially an N-unsubstituted aminomethyl group, which are required for the substitution, can be made in situ by starting from the corresponding 12-hydroxy-9-(1-acylaminoalkyl) compound and reacting it with the substituting agent. Acyl migration from the nitrogen atom to the oxygen atom takes place intermediately, so that the corresponding 9-(1-aminoalkyl)-12-acyloxy compound is obtained which is then substituted according to this invention as described above.

If the new compounds contain asymmetric carbon atoms, for example in the aminoalkyl radical or in another position, and depending on the starting materials and reaction conditions used, they may be in form of optical antipodes or racemates or, if they contain at least 2 asymmetric carbon atoms, in form of isomer mixtures (racemate mixtures).

A resulting isomer mixture (racemate mixture) may be resolved into the two stereoisomeric (disastereometric) pure racemates on the basis of the physico-chemical differences between the constituents, for example by chromatography and/or fractional crystallization.

Resulting racemates may be resolved by known methods—for example by recrystallization from an optically active solvent, or with the aid of microorganisms or by reaction with an optically active acid capable of forming salts with the racemic compound and isolation of the salts thus obtained, for example on the strength of their different solubilities—into the diastereomers from which the antipodes may be liberated by treatment with suitable reagents. Particularly frequently used optically active acids are, for example, the D- and L-forms of tartaric acid, di-o-toluyltartaric, malic, mandelic, camphor-sulfonic or quinic acid. It is advantageous to isolate the more active of the two antipodes.

The reactions of this invention are advantageously performed with the use of starting materials that furnish the groups of final substances specially mentioned above and more particularly the specifically described or emphasized final products.

The 6',11,3',4'-tetrahydro - 6',10 - methano-spiro[anthracene - 9(10H),5'(2'H)-[1,3]oxazines] having the nucleus of the formula

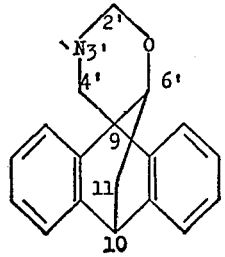

are new and also have valuable pharmacological properties, especially a psychotropic activity. Apart from a cocaine antagonistic action which can be demonstrated, for example in the mouse, they produce in the first place an inhibition of the psychomotor excitation due to mescaline in animal experiments, for example on oral administration of doses of 30 to 100 mg./kg. to mice. Accordingly, they are useful as psychopharmaceuticals and form part of the present invention.

Suitable substituents of the new 6',11'3',4'-tetrahydro-6',10 - methano - spiro[anthracene-9(10H),5'(2'H)[1,3] oxazines] are primarily those corresponding to the aforementioned substituents. Accordingly, the nitrogen atom in 3'-position may carry for example the monovalent substituents mentioned above for the amino group or it may be unsubstituted. Suitable substituents for the 2'-position are primarily lower alkyl radicals, for example those mentioned, or lower alkylene radicals, such as butylene-(1,4)- or pentylene-(1,5) radicals, or aralkyl or aryl radicals, for example those mentioned above. However, the 2'-position is preferably unsubstituted.

Of particular advantage are the compounds of the formula

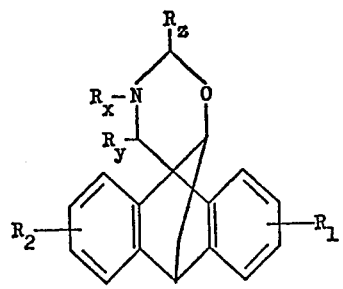

in which $R_1$ and $R_2$ have the meanings given above, $R_4$ stands for a lower alkyl group, for example one of those mentioned above, primarily methyl, a benzyl radical or a hydrogen atom, and $R_z$ and $R_y$ each for a lower alkyl radical, for example one of those mentioned, or a hydrogen atom, and especially 3'-methyl-6',11,3',4'-tetrahydro-6',10 - methano - spiro[anthracene-9(10H),5'(2'H)[1,3] oxazine] which, for example in the form of its methanesulfonate on oral administration of a dose of 30 mg./kg. to the mouse has a distinct mescaline-antagonistic action.

The new 6',11,3',4'-tetrahydro - 6',10 - mthanospiro-[anthracene-9(10H),5'(2'H)[1,3]oxazines] are prepared by per se conventional methods.

An advantageous procedure consists in closing the oxazine ring in an appropriate N-substituted or N-monosubstituted 9-(aminomethyl) - 12 - hydroxy-9,10-dihydro-9,10-ethano-anthracene by reaction with a corresponding oxo compound, such as an aldehyde or ketone.

Cyclization is performed in per se conventional manner, preferably in the presence of a solvent and appropriately in the presence of a condensing agent, for example a mineral acid or carboxylic acid, such as formic acid. If necessary, the reaction may be performed in an aromatic hydrocarbon, such as benzene or toluene and the water formed during the reaction distilled off azeotropically.

Resulting oxazines which contain a hydrogen atom in 3'-position can be substituted in the usual manner. The substitution is performed by reaction with a reactive ester of a corresponding school. Reactive esters are primarily esters with hydrohalic acids, such as hydrochloric, hydrobromic, or hydroiodic acid, with sulfuric acid or with arylsulfonic acids, such as benzenesulfonic, para-bromobenzenesulfonic or para-toluenesulfonic acid.

The reaction is performed in the usual manner, advantageously in the presence of a solvent, and for example in the presence of a condensing agent, such as a basic condensing agent, at room temperature or with cooling or heating.

The substitution can also be performed reductively, for example by reaction with a corresponding oxo compound, such as an aldehyde or ketone, and reduction of the resulting condensation product. Reducing agents that may be used are, for example, catalytically activated hydrogen, such as hydrogen in the presence of a platinum, palladium or nickel catalyst, or formic acid. To prevent the oxazine ring being split, hydrolyzing conditions should be avoided, and the reduction, in the case of catalytic hydrogenation, discontinued when the calculated quantity of hydrogen has been adsorbed.

Substitution may also take place simultaneously with the closing of the oxazine ring. Thus, for example, a 9-aminomethyl compound which is unsubstituted at the amino group can be reacted with formic acid and formaldehyde, advantageously while avoiding too large an excess of water, as as to form the oxazine ring and to methylate the resulting oxazine in 3'-position.

The N-unsubstituted 9-(aminoalkyl) -9,10 - dihydro-9,10-ethanol-anthracenes used as starting materials, which contain in position 12 a free or acylated hydroxyl group or an oxo group, are new and likewise possess an antagonistic activity towards cocain and mescalin. Therefore, they are likewise included in this invention; they may be prepared in a similar manner as the corresponding N-substituted compounds, by using as starting material in each case the N-unsubstituted instead of the N-substituted compound. Furthermore, they are also obtained when the radical in 9-position of a corresponding 9-cyano, 9-cyanoalkyl, 9-nitroalkyl or 9-hydroxyiminoalkyl compound is reduced to the N-unsubstituted aminoalkyl radical. The reduction is carried out in the usual manner; nitro groups, for example, may be reduced with nascent hydrogen, for example with a metal, such, as iron, and a mineral acid, or with zinc and an acid or alkali metal hydroxide, or with catalytically activated hydrogen. Cyano groups may be reduced, for example, with nascent hydrogen, for example with metals, such as sodium in a lower alkanol such as ethanol or butanol, or with catalytically activated hydrogen. Hydroxyiminoalkyl radicals can be hydrogenated, for example, with metal hydrides, for example alkali metal-earth metal hydrides such as alkali metal borohydrides, for example sodium borohydride, or with catalytically activated hydrogen. The catalytic reduction is carried out, for example, with hydrogen in the presence of a metal catalyst, such as a nickel, palladium or platinum catalyst, preferably in an organic solvent such as a lower alkanol, for example methanol or ethanol, or in an amide, for example formamide or dimethylformamide, or glacial acetic acid, if desired, or required in the presence of ammonia.

The 9,10-dihydro-9,10-ethano-anthracenes used as starting materials or intermediates, which contain in position 12 a free or acylated hydroxyl group or an oxo group and in position 9 a radical that differs from the desired N-substituted or N-unsubstituted aminoalkyl radical in that it carries an oxo group on at least one carbon atom vicinal to a nitrogen atom, are likewise new and included in this invention. They are obtained, for example, when a corresponding 9-aminoalkyl compound is acylated by means of a halide, such as the chloride, or an anhydride of a monocarboxylic or dicarboxylic acid, or when a halide, such as the chloride, of a corresponding 12-oxo-, -acyloxy- or -hydroxy-9,10-dihydro-9,10-ethano - anthracene-9-carboxylic or 9-alkanecarboxylic acid is reacted with ammonia or with a primary or secondary amine.

The oxazines mentioned and the other amino compounds mentioned which are useful as starting materials are obtained in the free form or as salts, depending on the reaction conditions and starting materials used. Salts and free compounds can be converted one into the other, for example as described above.

The compounds mentioned which can be used as starting materials may be present as optical antipodes, racemates or mixtures of isomers, depending on whether they contain any asymmetric carbon atoms and how many. If desired, racemates and mixtures of isomers can be resolved, as afore-described.

The other starting materials are known or, insofar as they are new, they may be prepared by known methods, for example methods analogous to those described in the examples.

The new compounds including the starting materials which have been described as pharmacologically active may be used, for example, in the form of pharmaceutical preparations containing them in the free form or in the form of their salts, especially of therapeutically acceptable acid addition salts, in conjunction or admixture with an organic or inorganic, solid or liquid pharmaceutical excipient suitable, for example for enteral, such as oral, or parenteral administration. Suitable excipients are substances that do not react with the new compounds, for example water, gelatin, starches, lactose, stearyl alcohol, magnesium stearate, talcum, vegetable oils, benzyl alcohols, gums, propyleneglycols, white petroleum jelly or other known medicinal excipients. The pharmaceutical preparations may be, for example, tablets, dragees, capsules or suppositories, or in liquid form solutions (for example elixirs or syrups), suspensions or emulsions. They may be sterilized and/or contain assistants such as preserving, stabilizing, wetting or emulsifying agents, solubilizers, salts for regulating the osmotic pressure or buffers. They may also contain further therapeutically valuable substances. The pharmaceutical preparations are formulated by the usual methods.

The new compounds may also be used in form of animal feedstuffs or additives to animal feedstuffs using, for example, the conventional extenders and diluents, and feedstuffs respectively.

The following examples illustrate the invention.

Example 1

A suspension of 6 g. of lithium-aluminum hydride in 200 ml. of tetrahydrofuran is dropped at 10° C. into a solution of 30 g. of 9-(acetylaminomethyl)-12-hydroxy-9,10-dihydro-9,10-ethano-anthracene in 200 ml. of tetrahydrofuran, and the mixture is refluxed for 1 hour, then cooled to room temperature, and 12 ml. of water in 20 ml. of tetrahydrofuran are dropped in. The precipitate formed is filtered off and the filtrate evaporated under vacuum. The residue is dissolved in chloroform and extracted with 200 ml. of N-hydrochloric acid. The acid extract is rendered alkaline with sodium hydroxide solution, and the precipitated base is extracted with chloroform. The chloroform extract is evaporated and furnishes 9 - (ethylaminomethyl) - 12 - hydroxy - 9,10-dihydro-9,10-ethano-anthracene of the formula

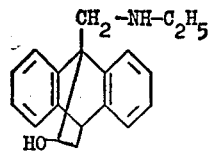

in crystals which melt at 142° C. after recrystallization from petroleum ether. The hydrochloride melts at 246° C.

The 9 - (acetylaminomethyl) - 12 - hydroxy-9,10-dihydro-9,10-ethano-anthracene used as starting material may be prepared in the following manner:

A mixture of 100 g. of 9-anthraldehyde and 200 g. of vinyl acetate in 750 ml. of toluene is heated in an autoclave for 24 hours at 200° C., then evaporated and the residue is crystallized from ethanol, to yield crystalline 12 - acetoxy - 9,10 - dihydro - 9,10-ethano-9-anthraldehyde melting at 138–140° C.

50 grams of this aldehyde are hydrogenated in a solution of 10 g. of ammonia in 1200 ml. of ethanol in the presence of 6 g. of Raney nickel under a hydrogen pressure of 25 atmospheres (gauge) at 100° C. After 17 hours the catalyst is filtered off and the filtrate evaporated to dryness. The residue is dissolved in chloroform and the solution successively extracted with N-sulfuric acid, N-sodium hydroxide solution and with water and evaporated to yield 9 - (acetylaminomethyl) - 12 - hydroxy-9,10-dihydro - 9,10 - ethano-anthracene which melts at 166–168° C. on recrystallization from ethylacetate+ether.

Example 2

12 grams of 9 - (N-acetyl-ethylaminomethyl)-12-hydroxy - 9,10 - dihydro - 9,10 - ethano-anthracene in 50 ml. of tetrahydrofuran are dropped into a suspension of 3 g. of lithium-aluminum hydride in 70 ml. of tetrahydrofuran and the whole is refluxed for 1 hour and cooled. Then 3 ml. of water in 10 ml. of tetrahydrofuran are cautiously dropped in and the precipitate formed is filtered off. The filtrate is evaporated under vacuum and the residue dissolved in chloroform and extracted with N-sulfuric acid. The acid extract is rendered alkaline with sodium hydroxide solution and the liberated base extracted with chloroform, to yield 9 - (diethylaminomethyl) - 12-hydroxy - 9,10 - dihydro - 9,10 - ethano-anthracene of the formula

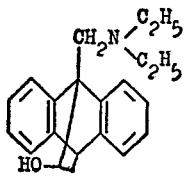

which melts at 114–116° C. on recrystallization from hexane.

The hydrochloride of this compound melts at 239–240° C.

The 9 - (N-acetyl-ethylaminomethyl) - 12 - hydroxy-9,10 - dihydro - 9,10 - ethano-anthracene used as starting material may be prepared thus:

10 grams of 9-(ethylaminomethyl)-12-hydroxy-9,10-dihydro - 9,10 - ethano-anthracene are acetylated by reaction with 20 ml. of acetic anhydride in 40 ml. of pyridine at 0° C. The whole is evaporated under vacuum and the residue dissolved in chloroform and washed with 2 N-hydrochloric acid and with water. Evaporation leaves the amide which melts at 96–98° C. after recrystallization from ethanol+hexane.

Example 3

10 grams of 9 - (benzyliminomethyl) - 12 - acetoxy-9,10 - dihydro - 9,10 - ethano-anthracene in 100 ml. of tetrahydrofuran are dropped into a suspension of 1.5 g. of lithium-aluminum hydride in 50 ml. of tetrahydrofuran at room temperature and the whole is boiled for 1 hour and then cooled. 10 ml. of water in 10 ml. of tetrahydrofuran are added and the precipitate formed is filtered off. The filtrate is evaporated and the residue recrystallized from ethanol+hexane, to yield 9 - (benzylaminomethyl)-12 - hydroxy - 9,10 - dihydro - 9,10 - ethano-anthracene of the formula

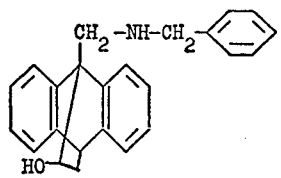

in crystals melting at 120–121° C.

The hydrochloride of this compound melts at 278–279° C.

The 9 - (benzyliminomethyl) - 12 - acetoxy - 9,10 - dihydro - 9,10 - ethano-anthracene used as starting material may be prepared in the following manner:

A mixture of 10 g. of 12 - acetoxy - 9,10 - dihydro-9,10 - ethano - 9 - anthraldehyde and 7.3 g. of benzylamine in 50 ml. of benzene is reacted at the boil, then evaporated and the residue recrystallized from benzene+pentane to yield 9 - (benzyliminomethyl) - 12-acetoxy - 9,10 - dihydro - 9,10 - ethano-anthracene melting at 150–151° C.

Example 4

A solution of 12.0 g. of 3'-methyl-6',11,3',4'-tetrahydro-6',10 - methano-spiro-[anthracene - 9(10H),5'(2'H) [1,3]oxazine] is added dropwise to a suspension of 4.0 g. of lithium-aluminum hydride in 150 ml. of tetrahydrofuran and the mixture is then heated at 50° C. for 2 hours. After cooling to room temperature there are added successively 5 ml. of water, 5 ml. of 15% sodium hydroxide solution, and 15 ml. of water, and the precipitate which forms is filtered off. After cooling, 9-(dimethylaminomethyl)-12-hydroxy - 9,10 - dihydro-9,10-ethano-anthracene of the formula

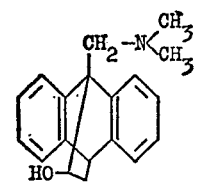

remains behind which, after being recrystallized from ethanol, melts at 150–154° C. The methanesulfonate melts at 213–214° C.

The 3'-methyl-6',11,3'4'-tetrahydro - 6'-10 - methano-spiro[anthracene-9(10H),5'(2'H)-[1,3]oxazine] used as starting material may be prepared thus:

A mixture of 1 g. of 9-(acetylaminomethyl)-12-hydroxy-9,10-dihydro-9,10-ethano-anthracene, 15 ml. of concentrated hydrochloric acid and 15 ml. of dioxane is refluxed for 4 hours and then evaporated. The residue is taken up in water and extracted with ether. The aqueous phase is rendered alkaline with sodium hydroxide solution and extracted with chloroform, and evaporated, to yield 9-(aminomethyl) - 12-hydroxy-9,10-dihydro-9,10-ethano-anthracene which melts at 132–133° C. after recrystallization from ether and sublimation. The hydrochloride melts at 268° C.

5.0 g. of 9-(aminomethyl)-12-hydroxy-9,10-dihydro-9,10-ethano-anthracene in 50 ml. of formic acid are heated at 90° C. for 2 hours with 4 ml. of 30% formalin. The reaction mixture is then poured into 300 ml. of water and rendered alkaline by the addition of 120 ml. of 10 N sodium hydroxide solution before it is extracted with methylene chloride. On drying and evaporation of the solvent, 3' - methyl-6',11,3',4'-tetrahydro-6',10-methano-spiro[anthracene-9(10H),5'(2'H)[1,3]oxazine] of the formula

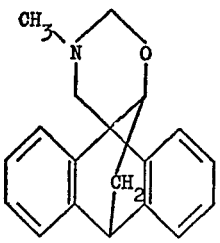

is obtained in the form of crystals which melt at 145–148° C. The methanesulfate of this compound melts at 245° C.

Example 5

A suspension of 10.5 g. of β-(12-hydroxy-9,10-dihydro-9,10-ethano-9-anthryl)-propionic acid methylamide is added dropwise at room temperature to a suspension of 3.0 g. of lithium-aluminum hydride in 50 ml. of tetrahydrofuran and the mixture heated at 60° C. 3 hours.

After cooling to room temperature, there are added successively 5 ml. of water, 5 ml. of 15% sodium hydroxide solution and 15 ml of water. The resulting precipitate is filtered off, and the filtrate evaporated in vacuo. 9-(γ-methylaminopropyl)-12-hydroxy - 9,10 - dihydro - 9,10-ethano-anthracene of the formula

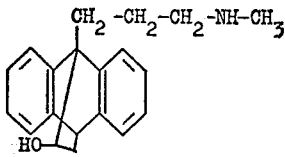

remains behind. After recrystallization from isopropanol the compound melts at 132–135° C. The methanesulfonate melts at 168–170° C.

The β-(12-hydroxy-9,10-dihydro - 9,10 - ethano-9-anthryl)propionic acid methylamide used as starting material can be prepared as follows:

A solution of 20 g. of 12-acetoxy-9,10-dihydro-9,10-ethano-9-anthraldehyde, 9.0 g. of cyanoacetic acid ester and 1 ml. of piperidine in 100 ml. of toluene is boiled for 2 hours, the water formed being separated continuously. On evaporation of the toluene, crystalline ethyl α-cyano-β-(12 - acetoxy-9,10-dihydro - 9,10 - ethano-9-anthryl)-acrylate remains behind which, after recrystallization from alcohol, melts at 145–148° C.

22.0 g. of this ester are dissolved in 200 ml. of dimethylformamide, and the solution treated with 2.0 g. of palladium carbon (10%), then hydrogenated at room temperature under atmospheric pressure. When the uptake of hydrogen is complete, the catalyst is filtered off, and the filtrate evaporated. Ethyl α-cyano-β-(12-acetoxy-9,10-dihydro-9,10-ethano-9-anthryl)-propionate is obtained which, after recrystallization from ethanol, melts at 169–170° C.

A solution of 16.0 g. of this ester in 100 ml. of glacial acetic acid is treated with 50 ml. of concentrated hydrochloric acid, then boiled for 12 hours. The batch is then poured into ice-water, and ammonia is added until a basic reaction is achieved. The lactone of β-(12-hydroxy-9,10 - dihydro-9,10-ethano-9-anthryl)-propionic acid precipitates. After sublimation is melts at 96–98° C.

15.0 g. of this lactone are heated at 120° C. for 2 hours with 15.0 g. of methylamine in 100 ml. of ethanol. On evaporation of the solvent, crystalline β-(12-hydroxy-9,10-dihydro-9,10-ethano-9-anthryl)-propionic acid methylamide remains behind, which melts at 221–224° C.

Example 6

A solution of 9 g. of 9-(aminomethyl)-12-oxo-9,10-dihydro-9,10-ethano-anthracene and 9 ml. of a 30% aqueous solution of formaldehyde in 75 ml. of formic acid is heated at 90° C. for 2 hours. After that, 5 N-sodium hydroxide solution is added until an alkaline reaction is achieved, and the batch is then extracted with methylene chloride. After drying and evaporation of the solvent, 9-(dimethylaminomethyl)-12-oxo - 9,10 - dihydro - 9,10-ethano-anthracene of the formula

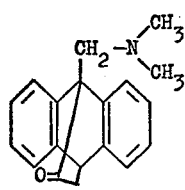

remains behind in the form of crystals of melting point 149–153° C. The hydrochloride melts at 238–240° C.

The 9-(aminomethyl) - 12 - oxo - 9,10 - dihydro - 9,10-ethano-anthracene used as starting material can be obtained as follows:

A mixture of 50 g. of 9-(aminomethyl)-12-hydroxy-9,10-dihydro-9,10-ethano-anthracene, 19 g. of acetic anhydride and 500 ml. of benzene are boiled for 2 hours. On cooling, 9 - (acetylaminomethyl)-12-hydroxy-9,10-dihydro-9,10-ethano-anthracene of melting point 165–167° C. separates out.

13 g. of chromic acid in 25 ml. of water are added dropwise to a solution of 50 g. of 9-(acetylaminomethyl)-12 - hydroxy-9,10-dihydro-9,10-ethano-anthracene in 500 ml. of glacial acetic acid while stirring at room temperature. After 7 hours, 1200 ml. of water and 700 ml. of 10 N-sodium hydroxide solution are added, and the batch is extracted with methylene chloride. After drying and evaporation of the solvent, 9-(acetylaminomethyl)-12-oxo-9,10-dihydro-9,10-ethano - anthracene remains behind, which after recrystallization from ethanol melts at 193–195° C.

50.0 g. of 9-acetylaminomethyl)-12-oxo-9,10-dihydro-9,10-ethano-anthracene are boiled for 24 hours at 400 ml. of 2 N-hydrochloric acid, then filtered hot. When sodium hydroxide solution is added to the filtrate, a precipitate forms, which is extracted with methylene chloride. On drying and evaporation of the solvent, 9-(aminomethyl)-12-oxo-9,10-dihydro-9,10-ethano - anthracene remains behind, the hydrochloride of which melts at 268° C.

Example 7

5 ml. of 30% formalin are added to a solution of 48 g. of 9-(acetylaminomethyl)-12-hydroxy-9,10-dihydro-9,10-ethano-anthracene in 80 ml. of anhydrous formic acid, and the mixture is heated at 90° C. for 3 hours. 300 ml. of water are then added, and the acid solution extracted with ether. The aqueous phase is separated and rendered alkaline with 10 N-sodium hydroxide solution, then extracted with methylene chloride. After drying and evaporation of the solvent, crystalline 9-(dimethylaminomethyl)-12-acetoxy-9,10-dihydro - 9,10 - ethano-anthracene of the formula

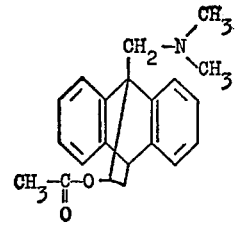

melting at 166–169° C. remains behind.

Example 8

Reduction of

β-(12-hydroxy-9,10-dihydro-9,10-ethano-9-anthryl)-propionic acid-dimethylamide,
β-(12-hydroxy-9,10-dihydro-9,10-ethano-9-anthryl)-propionic acid [N'-(β-hydroxy-ethyl)-piperazide],
β-(12-hydroxy-9,10-dihydro-9,10-ethano-9-anthryl)-propionic acid morpholide,
β-(12-hydroxy-9,10-dihydro-9,10-ethano-9-anthryl)-propionic acid-pyrrolidide or
β-(12-hydroxy-9,10-dihydro-9,10-ethano-9-anthryl)-propionic acid-piperidide with lithium aluminum hydride in a manner analogous to that described in Example 5 leads to 9-(γ-dimethylaminopropyl)-12-hydroxy-9,10-dihydro-9,10-ethano-anthracene,
9-[γ-(N'-[β-hydroxyethyl]-piperazino)-propyl]-12-hydroxy-9,10-dihydro-9,10-ethano-anthracene,
9-(γ-morpholinopropyl)-12-hydroxy-9,10-dihydro-9,10-ethano-anthracene,
9-(γ-pyrrolidinopropyl)-12-hydroxy-9,10-dihydro-9,10-ethano-anthracene, or
9-(γ-piperidinopropyl)-12-hydroxy-9,10-dihydro-9,10-ethano-anthracene, respectively, and salts thereof, such as the hydrochlorides or methanesulfonates.

Example 9

Hydrolysis of

9-[γ-(N-acetyl-methylamino)-propyl]-12-oxo-9,10-dihydro-9,10-ethano-anthracene, 9-(N-acetyl-ethylaminomethyl)-12-oxo-9,10-dihydro-9,10-ethano-anthracene or 9-(N-acetyl-benzylaminomethyl)-12-oxo-9,10-dihydro-9,10-ethano-anthracene with hydrochloric acid, for example, analogous to the hydrolysis of the 9-(acetyl-aminomethyl)-12-oxo compound described in Example 6, leads to 9-(γ-methylaminopropyl)-12-oxo-9,10-dihydro-9,10-ethano-anthracene, 9-(ethylaminomethyl)-12-oxo-9,10-dihydro-9,10-ethano-anthracene, or 9-(benzylaminomethyl)-12-oxo-9,10-dihydro-9,10-ethano-anthracene, respectively, and salts thereof, such as the hydrochlorides or methanesulfonates.

Example 10

Reduction of 9-(cyclopropyliminomethyl)-12-acetoxy-9,10-dihydro-9,10-ethano-anthracene (obtainable by reacting 12-acetoxy-9,10-dihydro-9,10-ethano-9-anthraaldehyde with cyclopropylamine), or 9-(cyclopropyliminomethyl) - 12 - hydroxy-9,10-dihydro-9,10-ethano-anthracene (obtainable by reacting 12-hydroxy-9,10-dihydro-9,10 - ethano-9-anthraaldehyde with cyclopropylamine) with lithium-aluminum hydride in a manner analogous to that described in Example 3 leads to 9-(cyclopropylaminomethyl) - 12 - hydroxy-9,10-dihydro-9,10-ethanoanthracene, or salts thereof, such as the hydrochloride or methanesulfonate.

When the reduction of 9-(cyclopropyliminomethyl)-12-acetoxy-9,10-dihydro - 9,10 - ethanoanthracene is performed catalytically, 9-(cyclopropylaminomethyl)-12-acetoxy-9,10-dihydro-9,10-ethanoanthracene is obtained or a salt thereof, such as the hydrochloride or methanesulfonate.

Example 11

By reacting 9-(dimethylaminomethyl)-12-oxo-9,10-dihydro-9,10-ethano-anthracene with methyl magnesium bromide in tetrahydrofuran and destroying the magnesium halide compound with water, 9-(dimethylaminomethyl) - 12 - methyl - 12 - hydroxy-9,10-dihydro-9,10-ethano-anthracene can be obtained or a salt thereof, such as the hydrochloride or the methanesulfonate.

Example 12

Methylation of 9-(γ-methylaminopropyl)-12-oxo-9,10-dihydro-9,10-ethano-anthracene or 2,6-dichloro-9-(aminomethyl) - 12 - oxo-9,10-dihydro-9,10-ethano-anthracene with formaldehyde and formic acid in a manner analogous to that described in Example 6, leads to 9-(γ-dimethylaminopropyl) - 12 - oxo-9,10-dihydro-9,10-ethanoanthracene, or 2,6-dichloro-9-(dimethylaminomethyl)-12-oxo-9,10-dihydro-9,10-ethano-anthracene, respectively, or salts thereof, such as the hydrochloride or methanesulfonate.

Example 13

By reduction of 2,6-dichloro-3'-methyl-6'-11,3',4'-tetrahydro - 6',10 - methano-spiro[anthracene - 9(10H),5'(2'H)[1,3]-oxazine] with lithium-aluminum hydride in a manner analogous to that described in Example 4, it is possible to obtain 2,6-dichloro-9-(dimethylaminomethyl)-12-hydroxy-9,10-dihydro-9,10-ethano-anthracene and its salts, such as the hydrochloride or the methanesulfonate.

The 2,6-dichloro-3'-methyl-6',11,3',4'-tetrahydro-6',10-methano - spiro[anthracene - 9(10H),5'(2'H)[1,3]oxazine] used as starting material can be obtained in a manner analogous to that described in Example 4 by reacting 2,6-dichloro-9-(aminomethyl)-12-hydroxy-9,10-dihydro-9,10-ethano-anthracene with formic acid and 30% formalin. It can be converted in the usual manner into salts, for example the hydrochloride or the methanesulfonate.

Example 14

By oxidizing 9-(diethylaminomethyl)-12-hydroxy-9,10-dihydro-9,10-ethanoanthracene it is possible to obtain 9-(diethylaminomethyl)-12-oxo-9,10-dihydro-9,10 - ethano-anthracene and its salts, for example the hydrochloride or the methanesulfonate.

Example 15

Tablets, each containing 25 mg. of active substance, can be prepared, for example, from the following ingredients:

| | Mg. |
|---|---|
| 9-(dimethylaminomethyl) - 12 - acetoxy-9,10-dihydrochloride | 25 |
| Lactose | 35 |
| Wheat starch | 44.4 |
| Colloidal silicic acid | 6 |
| Magnesium stearate | 0.6 |
| Talc | 9 |
| | 120.0 |

In an analogous manner, tablets containing 3'-methyl-6',11,3',4'-tetrahydro - 6',10 - methano-spiro[anthracene-9(10H),5'(2'H)[1,3]oxazine] methanesulfonate or 9-(diethylaminomethyl) - 12 - hydroxy - 9,10 - dihydro-9,10-ethano-anthracene hydrochloride can be made.

We claim:

1. A member selected from the group consisting of compounds of the formula

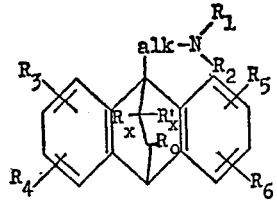

in which alk stands for lower alkylene, $R_1$ and $R_2$ each stands for a member selected from the group consisting of hydrogen, lower alkyl, and lower cycloalkyl, at least one of $R_1$ and $R_2$ being other than hydrogen, $R_x$ stands for a member selected from the group consisting of hydroxy, lower alkanoyloxy and benzoyloxy, $R'_x$ for a member selected from the group consisting of hydrogen and lower alkyl, $R_o$ stands for a member selected from the group consisting of hydrogen and methyl, and $R_3$, $R_4$, $R_5$ and $R_6$ each stands for a member selected from the group consisting of hydrogen, lower alkyl and halogen and their therapeutically acceptable acid addition salts.

2. A product as claimed in claim 1 in which

stands for a member selected from the group consisting of monolower alkylamino and di-lower alkylamino.

3. A product as claimed in claim 2, in which $R_x$ stands for a member selected from the group consisting of hydroxy and lower alkanoyloxy and $R'_x$ for hydrogen.

4. A product as claimed in claim 3, in which alk stands for a member selected from the group consisting of methylene and 1,3-propylene and $R_3$, $R_4$, $R_5$ and $R_6$ stand for hydrogen.

5. A product as claimed in claim 1 in which alk stands for methylene,

for a member selected from the group consisting of methylamino, dimethylamino, ethylamino and diethylamino, $R_x$ stands for hydroxy and $R'_x$ for hydrogen and $R_o$, $R_3$, $R_4$, $R_5$ and $R_6$ stand for hydrogen atoms.

6. A product as claimed in claim 1 in which alk stands for 1,3-propylene,

for a member selected from the group consisting of methylamino and dimethylamino, $R_x$ stands for hydroxy and $R'_x$ for hydrogen and $R_o$, $R_3$, $R_4$, $R_5$ and $R_6$ stand for hydrogen atoms.

7. A product as claimed in claim 1 in which alk stands for methylene,

for dimethylamino, $R_x$ stands for hydroxy and $R'_x$ for hydrogen, $R_3$ stands for 2-chlorine, $R_5$ for 6-chlorine and $R_o$, $R_4$ and $R_6$ represent hydrogen atoms.

8. A product as claimed in claim 1 which product is 9 - (dimethylaminomethyl) - 12 - acetoxy-9,10-dihydro-9,10-ethano-anthracene or a therapeutically acceptable acid addition salt thereof.

9. A product as claimed in claim 1 which product is 9-(cyclopropylaminomethyl) - 12 - acetoxy-9,10-dihydro-9,10-ethano-anthracene or a therapeutically acceptable acid addition salt thereof.

10. A product as claimed in claim 1 which product is 9-(dimethylaminomethyl)-12-methyl-12-hydroxy-9,10-dihydro-9,10-ethano-anthracene or a therapeutically acceptable acid addition salt thereof.

References Cited
UNITED STATES PATENTS
3,399,201    8/1968    Schmidt et al. _____ 260—515

VIVIAN GARNER, Primary Examiner

U.S. Cl. X.R.

260—239 B, 239 BF, 239 R, 243 B, 244 R, 247.2 B, 247.7 A, 247.9 E, 268 PC, 293.62, 326.3, 326.5 C, 343.7, 465 D, 476 C, 491, 501.11, 501.12, 501.18, 558 R, 562 P, 570.8 TC, 570.9; 424—199, 232, 233, 246, 248, 250, 267, 280, 311, 325